Oct. 16, 1928.
O. ONSRUD
1,688,312
COTTON HARVESTING MACHINE
Filed Sept. 13, 1926    2 Sheets-Sheet 2
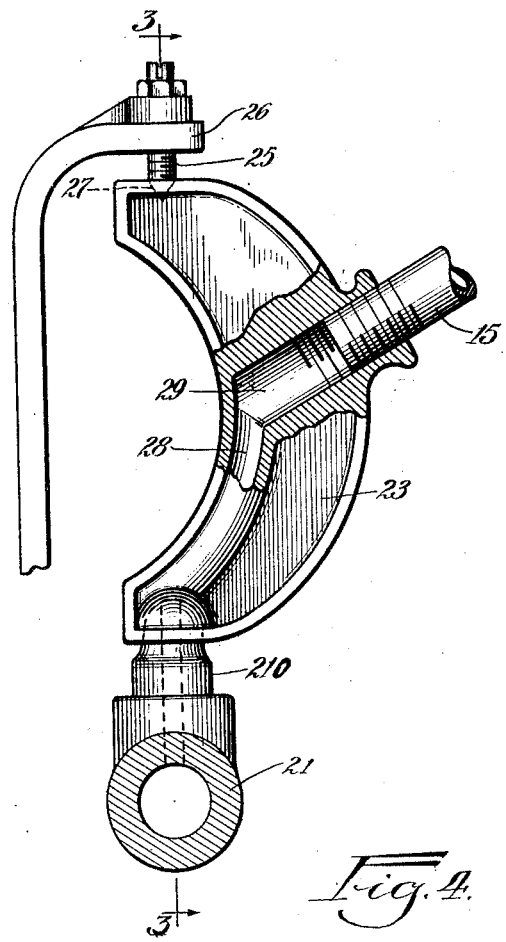
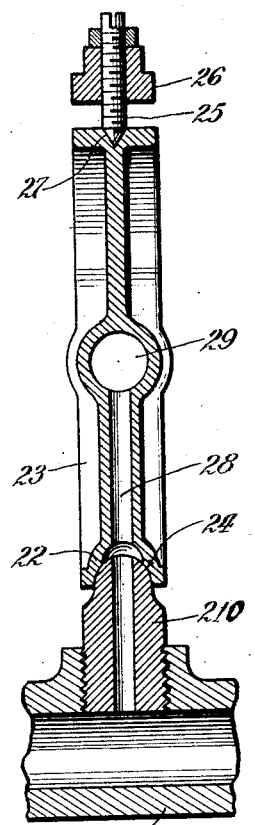
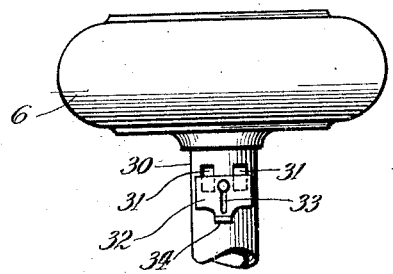
Inventor:
Oscar Onsrud, Patented Oct. 16, 1928.

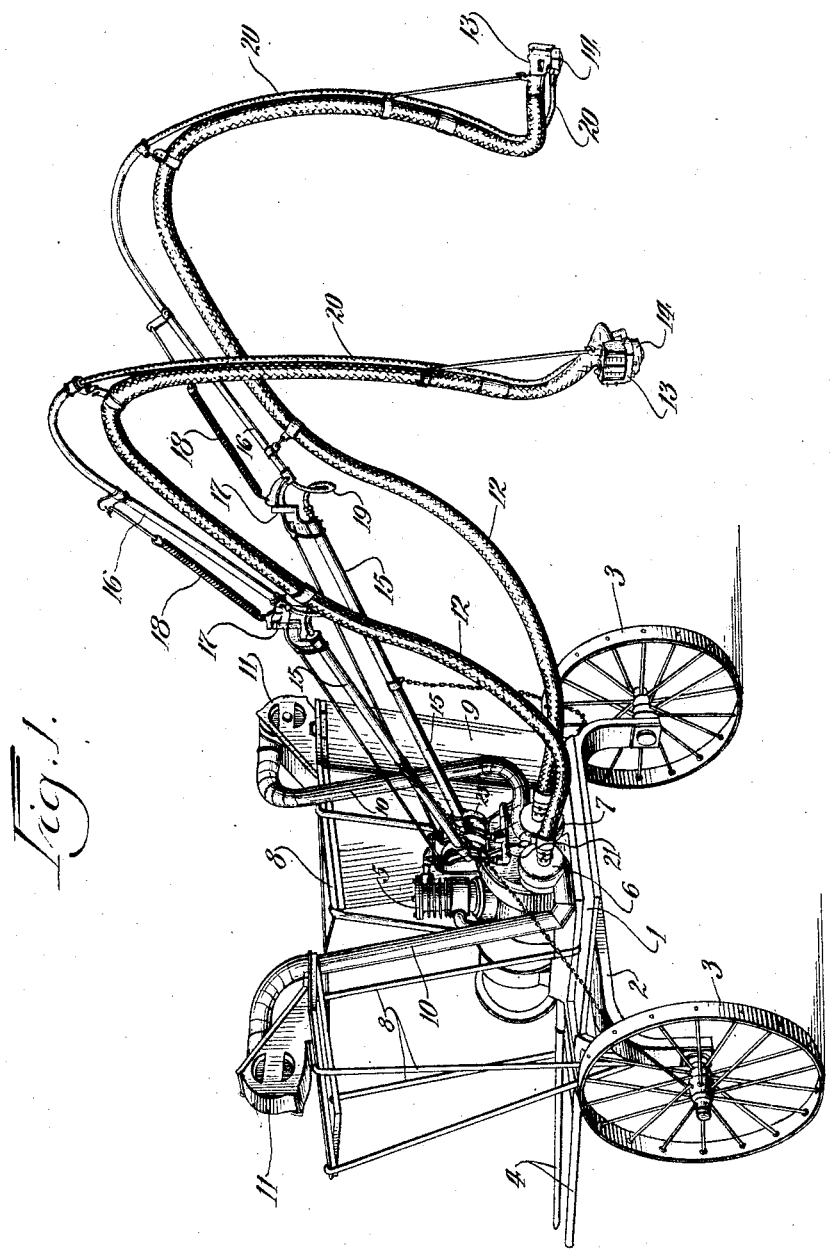

1,688,312

UNITED STATES PATENT OFFICE.

OSCAR ONSRUD, OF CHICAGO, ILLINOIS, ASSIGNOR TO L. L. VALENTINE, OF CHICAGO, ILLINOIS.

COTTON-HARVESTING MACHINE.

Application filed September 13, 1926. Serial No. 135,058.

The present invention has for its object to produce a simple, novel and rugged machine adapted to be drawn or otherwise moved through a cotton field and permit the cotton to be picked quickly and efficiently over a comparatively wide swath.

Specifically considered, the invention relates to that type of machine in which there is a picker head at the free end of a long flexible suction conduit which carries the cotton fibre gathered by the head to a bag or other receptacle where it is discharged. Viewed in one of its aspects, the present invention may be said to have for its object to produce a simple and novel arrangement of parts which will permit a bag or bags to be effectively supported in such a manner that the cotton may easily be delivered thereto, without causing the bag or bags to form obstructions as the machine traverses a field.

The cotton is carried away from the head by suction to the blower that produces the suction, and is then pushed or blown from the discharge side of the blower into the bag or other receptacle. In order to force the cotton away from the discharge side of the blower, it is necessary that there be a considerable volume of air to carry the cotton. However, if the suction conduit contains enough cotton to form a wall or bridge across the same, very litle air will be drawn into the blower and there will be insufficient pressure to cause the cotton to flow normally to the discharge point. Viewed in another of its aspects, the present invention may be said to have for its object to provide a simple and novel means for permitting a sufficient volume of air to pass through the blower, irrespective of the amount of air that is traveling through the intake conduit with the cotton, to insure the successful discharge of the cotton.

In its most specific form, the present invention contemplates the use of an air driven picker head and, viewed in another of its aspects, my invention may be said to have for its object to produce a simple and novel construction and arrangement for storing air under pressure, equalizing the pressure, and delivering it to the operating mechanism for the picker head, by utilizing mainly elements that are required regardless of the type of motive power for the picker head.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a perspective view of a machine arranged in accordance with my invention; Fig. 2 is a view, partly in elevation and partly in section, showing the pivotal support for one of the booms that serves also as an air reservoir; Fig. 3 is a section taken approximately on line 3—3 of Fig. 2; and Fig. 4 is a top plan view of one of the blowers and the adjacent portion of the inlet conduit.

Referring to the drawings, 1 represents a vehicle body, which may consist simply of a platform secured upon a heavy axle 2 in the form of an inverted U; there being vehicle wheels 3 on the ends of the depending arms of the axle. Extending forwardly from the axle are shafts 4 between which a draft animal may be placed. On the platform is an air compressor 5 behind which are located two rotary blowers 6 and 7. On opposite sides of the compressor and blower unit are racks 8 adapted to support large bags 9, of which one is shown. The bags are suspended from the racks so as to be held open to receive the cotton as it is picked. Each blower has a discharge conduit 10 terminating above the corresponding rack so as to discharge into a bag hung from the latter. As is common in machines of this kind, each discharge conduit may terminate in a cleaning device 11 that forms the actual outlet for the same. To the inlet side of each blower is connected a long flexible conduit 12 of considerable diameter, each conduit having at its free end a picker head 13, the mechanism in which is operated by an air turbine in a housing 14 on the underside of the head.

In order to support the flexible conduits so as to hold them raised from the ground and at the same time permit the heads to be moved about over considerable areas, at will, I provide swinging booms, one for each flexible conduit. In the arrangement shown, each boom consists of a lower or inner member 15 in the form of a tube or pipe of considerable diameter, hinged to the compressor so as to be capable of swinging bodily about a vertical axis; together with an outer or upper tubular member 16 connected to the member 15 by a hinge mechanism 17; a tension spring 18 tending to hold the member 16 raised, but permitting it to be swung downwardly.

As will hereinafter be explained, air is admitted from the compressor into the section 15 of each boom, through the pivot of that boom. The outer end of each member 15 is connected to the inner end of the corresponding member 16 by a flexible pipe 19, whereas the outer end of each of the members 16 is connected to the turbine chamber of the corresponding picker head by a small flexible pipe 20.

The details of the air inlet to each of the booms are best shown in Figs. 2 and 3 in which 21 represents a manifold into which air is delivered from the compressor. A nipple 210, having a hemispherical upper end 22 is screwed into the manifold. A boom-supporting bracket 23 has in its lower end a seat 24 adapted to fit upon the hemispherical upper end of the nipple. A screw-threaded stud 25, having a pointed lower end, extends downwardly through an overhanging arm 26 extending upwardly from a part of the compressor frame and fits into a conical recess 27 in the upper end of the bracket. Thus the bracket is permitted to swing about the nipple and stud as centers. There is a passage 28 extending upwardly from the hemispherical seat 24 in the bottom of the bracket and communicating at its upper end with the opening 29 into which the inner or lower tubular member of the boom is fitted, so that when the compressor is in operation, air will enter the manifold and will then flow through the lower pivot into the boom and through the same to the corresponding picker head. The capacity of the pipes in which the booms are made, particularly the inner or lower sections 15, is considerable, so that the booms act as storage reservoirs for compressed air and serve to equalize the pressure, so that the pressure at each turbine will be comparatively even.

As the cotton is gathered by the picker heads, it is drawn inwardly through the flexible conduits 12 to the blowers and is then discharged from the latter through the discharge conduits 10 into bags placed to receive it. The motive power for carrying the cotton upwardly from the blowers to points above the bags depends upon volume of air drawn through the blowers. If the cotton in one of the flexible conduits is packed sufficiently to form a closure across the same, even though the cotton be moving, insufficient air will be drawn past the cotton and into the blower to insure the successful expulsion of the cotton from the discharge conduit. I have therefore provided means whereby the blowers are not compelled to rely upon air drawn through the flexible conduits for the purpose of discharging the cotton toward the bags. As best shown in Fig. 4, each blower has a central tubular intake 30 to which the corresponding suction conduit is connected. This intake has one or more ports 31 cut into the same near the blower casing, so that air may be drawn through these ports and be discharged by the blower, without being compelled to pass through the length of the flexible conduit. The ports are controlled by a gate or valve 32, which may be simply a plate, curved to fit the member 30 and connected to the latter by a pin and slot device 33 serving to hold the gate in place but permitting it to be moved from and toward the blower casing so as to vary the effective size of the port openings or completely close the ports. The gate may have a flange 34 bent up at one end to serve as a hand-hold by means of which it may be moved. Normally the ports may be closed but, if it is seen that the cotton is not being discharged freely, the ports may be opened more or less until the blower is given sufficient air, independent of that entering through the flexible conduit, to insure satisfactory discharge of the cotton reaching the blower.

I claim:

1. In a cotton harvesting machine, a long flexible suction conduit fixed at one end and having an air-driven picker head at the other end, a hollow swinging boom supporting the conduit to permit the picker head to be moved over a considerable area, the boom being hollow to constitute a storage and pressure-equalizing reservoir, means for introducing air under pressure into the boom, and means for delivering air from the boom to the picker head.

2. In a cotton harvesting machine, an air compressor, a long flexible suction conduit fixed at one end and having an air-driven picker head at its free end, a hollow swinging boom pivoted to the compressor and connected to the conduit to support the same, there being an air inlet from the compressor to the interior of the boom through the pivot of the boom and an air pipe extending from the boom to the picker head.

3. A cotton harvesting machine comprising a vehicle having thereon two blowers and an air compressor, said air compressor having a discharge manifold, two booms supported on said manifold for swinging movements about a vertical axis, there being a passage between the interior of the manifold and the interior of each of the booms, a long flexible suction conduit connected to each blower, one of said conduits being supported on each of said booms, a picker head on the end of each conduit, and a connection between the interior of each boom and the corresponding picker head.

In testimony whereof, I sign this specification.

OSCAR ONSRUD.